April 21, 1959
R. R. HILL
2,882,983
TWO PIECE AGRICULTURAL SWEEP
Filed Jan. 19, 1955
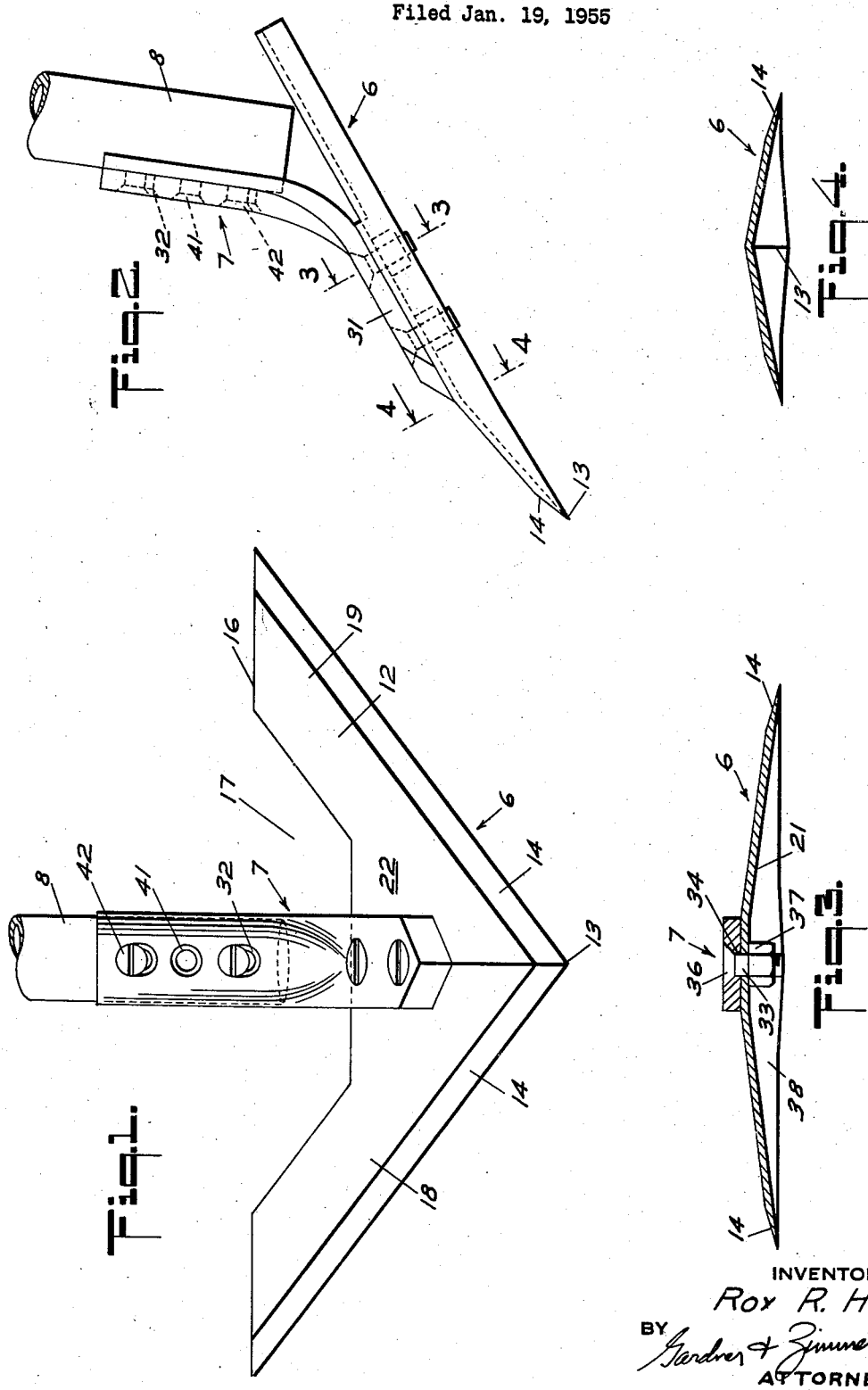
INVENTOR
Roy R. Hill
BY
Gardner & Zimmerman
ATTORNEYS

United States Patent Office 2,882,983
Patented Apr. 21, 1959

2,882,983

TWO PIECE AGRICULTURAL SWEEP

Roy R. Hill, Monterey Park, Calif., assignor, by mesne assignments, to Orendorff Manufacturing Company, Fresno, Calif., a corporation of California Application January 19, 1955, Serial No. 482,703

1 Claim. (Cl. 172—730)

This invention relates to soil cultivation devices, and is more particularly directed towards a light plow or cultivator commonly referred to as a sweep.

Sweeps are used in cultivating soil for a variety of different crops, and in general are adapted for cutting weeds or other vegetation and permitting the dirt to flow over the same so as to leave the vegetation on top of the soil. The particular shape of the sweep blade as well as the angle at which the sweep enters the ground naturally has a bearing on the specific functioning of the device and it may be appropriate to here point out that one of the difficulties encountered with present day sweeps is that each grower or farmer has particular ideas as to the attack angle of the blade into the ground, and consequently the supplier of the devices has necessarily been required to have a large inventory of sweeps so as to accommodate the desires of the particular user.

Further disadvantages appearing from the use of presently available sweeps arise primarily out of their construction which results in breakage of the sweep tongue after relatively short period of use, and before the blade of the sweep has been worn sufficiently to warrant its abandonment. Accordingly numerous sweep blades are now discarded which would have a substantial useful life remaining. It might be explained that the tongue of the sweep which has heretofore been made as an integral extension of the blade generally extends from the blade at an angle to the plane thereof, the tongue being adapted for engagement with a plow shank or the like. In some cases, the sweeps have been made without any tongue and are then commonly referred to as furrowers, the furrowers being adapted for direct engagement with the shank or other supporting member of the plow or other moving mechanism to which the sweep or furrower is attached. However, this type of sweep possesses certain disadvantages in its use and accordingly it is towards the type of sweep having a blade and tongue towards which this invention is particularly directed.

It is an object of the present invention to provide a sweep in which the blade and tongue are constructed as two separate units and releasably secured together, whereby the breakage or wearing out of one of the parts does not necessitate replacement by an entirely new unit.

Another object of the invention is to provide a sweep of the character described which may be manufactured far more economically than conventional integrally formed sweeps.

A still further object of the invention is to provide a sweep construction of the aforementioned character in which the sweep blade may be made of a different and more abrasive resistant material than the material utilized for the tongue, and in which the tongue may be treated such as by heat without danger of deleteriously affecting the blade.

A still further object of the invention is to provide an agricultural sweep of the type described in which the tongues may be provided and constructed at different angles so that a single blade may be utilized with various tongues so as to permit such blade to enter the ground at selected angular inclinations.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a top plan view of an agricultural sweep construction in accordance with the teachings of the present invention shown in operative position on a plow shank or the like.

Figure 2 is a side elevational view of the device as shown in Figure 1.

Figure 3 is a cross-sectional view taken substantially in the plane indicated by line 3—3 of Figure 2.

Figure 4 is a cross-sectional view taken substantially in the plane indicated by the line 4—4 of Figure 2.

As hereinabove stated, the sweep of the present invention broadly comprises a blade element generally indicated by the numeral 6 and a tongue element indicated by the numeral 7, these two parts being arranged to be releasably attached together for subsequent connection to a plow shank 8 or the like. It is by means of this independent construction that the objects and features of advantage hereinabove mentioned may be accomplished.

The blade 6 may assume a variety of forms, but in plan, generally comprises a V-shaped body 12 having an apex 13 and tapered cutting edges 14 extending from the apex. The rear end of the blade may be cut off transversely to the body axis, as indicated at 16, and is preferably provided with a recessed portion 17 which actually divides the rear portion of the sweep into a pair of diverging legs 18 and 19. The under surface 21 of the blade is preferably generally concave in configuration for a purpose to be hereinafter described. As the blade is arranged to enter the soil, it may be desirable to construct the same of an abrasive resistant material and by way of example only, a high carbon high chrome steel can be utilized for this purpose. Also, conventional hard facing operations may be performed along the cutting edges 14 so as to increase the efficiency of the blade and to materially increase the useful life thereof.

As will be understood, in conventional sweeps the central portion 22 of the blade which is disposed adjacent the recess 17 and which constitutes a divider between the pair of legs 18 and 19, is provided with a tongue adapted for securing of the blade to a plow shank. The tongue must be of a sufficient length so as to permit its attachment to at least two spaced portions of the shank so as to prevent relative rotation therebetween, and therefore the present day tongues extend rearwardly of the rear edges 16 of the blade. This of course necessitates using a metal blank much larger than that which would be required for construction of the blade alone and consequently a large amount of material is wasted in the construction of an integral tongue on the blade. In accordance with the present teachings, the independent tongue comprises a generally flat base portion 31 and an upwardly and angularly related integral extension 32, the angle between the portions 31 and 32 being in the neighborhood of 120 degrees. However, the particular angle will depend upon the desires of the users of the devices, as this included angle will actually control the attack angle of the blade after attachment of the parts. Accordingly, the tongues may be provided with a variety of included angles between the portions 31 and 32 varying, for example, from 90 degrees to 150 degrees. The base portion 31 is adapted to seat on the central portion 22 of the blade and by means of cooperating apertures 33 and 34 formed in the blade and tongue respectively, the same may be releasably secured together such as by means of a countersunk bolt 36 and nut 37 threadedly attached to the bolt adjacent the under surface 21 of the blade portion 22. By referring to Figures 2 and 3 it will be noted that the end of the bolt and the nut are disposed substantially entirely within the cavity 38 formed by the arcuate concave cross-sectional form of the blade and consequently the nut and bolt do not project beyond the plane defined by the edges 14 of the blade when the latter is set down on a horizontal surface.

The extension 32 of the tongue is likewise provided with a plurality of apertures 41 to permit the attachment of the tongue to the plow shank 8 by means of screws or bolts 42 or the like. Preferably, the extension 32 has a slightly arcuate cross-sectional form so as to permit its more contiguous relationship with a cylindrical shank.

By means of the present construction the blade and tongue may each be constructed so as to permit their maximum useful purposes. For example, the sweep blade should preferably have a thickness in the neighborhood of 3/16 inch to 3/8 inch, whereas the tongue thickness should be in the neighborhood of 3/8 inch to 3/4 inch. In other words, the tongue, which is subjected to severe stresses by movement of the blade through the ground should be approximately double the thickness of the blade, suggested thicknesses being 1/4 inch for the blade and 5/8 inch for the tongue. Not only is it desirable to have the blade of a thinner gauge material than the tongue, but it is likewise desirable to have the blade and tongue constructed of materials possessing different surface or structural qualifications. It was above mentioned that the blade could be made of an abrasive resistant material such as high carbon high chrome steel while the tongue may be constructed of plain steel. This of course would reduce the cost of the tongue relative to the cost of the blade and there is no need for the tongue to possess the high abrasive resistant qualities of the blade. Also, as the blade and tongue are now constructed separately, and only releasably attached together, it is possible to perform the heat treating, hardfacing or other operation on the respective parts without danger of interference from a different operation performed on one of the other parts and without requiring the unnecessary treatment of an entire unit.

From the foregoing description, it will be appreciated that while the sweep of the present invention is simple in construction and operation, it provides for advantages not heretofore available in agricultural cultivating equipment. It will likewise be appreciated that a single blade may be utilized in combination with tongues having various included angles between the base and extension portion thereof so as to further reduce the overall cost to the farmer who might desire different attack angles for the blade. In other words, a single blade may be utilized with a plurality of tongues instead of requiring the farmer to possess complete sweeps including the blade and tongue for each different operation or soil condition.

It will also be appreciated that instead of the complete blade as shown having the diverging cutting edges 14, in many instances a half blade is utilized, in which case the tongue would lie adjacent the inoperative edge of the blade.

What is claimed is:

An agricultural sweep comprising a generally V-shaped planar blade having a concave undersurface defining a cavity, said blade having a pair of legs and a central portion interconnecting said legs for a substantial distance along the length thereof, said central portion having a flattened upper surface, means defining cutting edges along the outer frontal portions of said blade legs and converging toward and intersecting at the front center end of the blade, said cutting edges substantially defining a plane, a tongue having a first portion with a flat undersurface arranged to overlie said flattened surface of the central blade portion adjacent said front center end of said blade and extending along an axis bisecting said legs, said tongue including an integrally formed second portion extending at a front angle in the range of 90 to 150 degrees to said first portion, means for releasably securing said first portion of the tongue to said central portion of the blade, said securing means extending into and being disposed substantially entirely within said cavity whereby said securing means does not project beyond the plane defined by the edges of the blade, said blade having a thickness of substantially one-half the thickness of the tongue, and said second portion including means thereon for attaching said second portion to a shank.

References Cited in the file of this patent
UNITED STATES PATENTS

| | | |
|---|---|---|
| 1,199,329 | Abramson | Sept. 26, 1916 |
| 1,777,029 | Bradford | Sept. 30, 1930 |
| 2,343,616 | Kay | Mar. 7, 1944 |
| 2,704,499 | Radway | Mar. 22, 1955 |